March 31, 1931.  L. A. MAPEL  1,798,692
DIAPHRAGM PRESSURE GAUGE
Filed Nov. 9, 1923  2 Sheets-Sheet 1
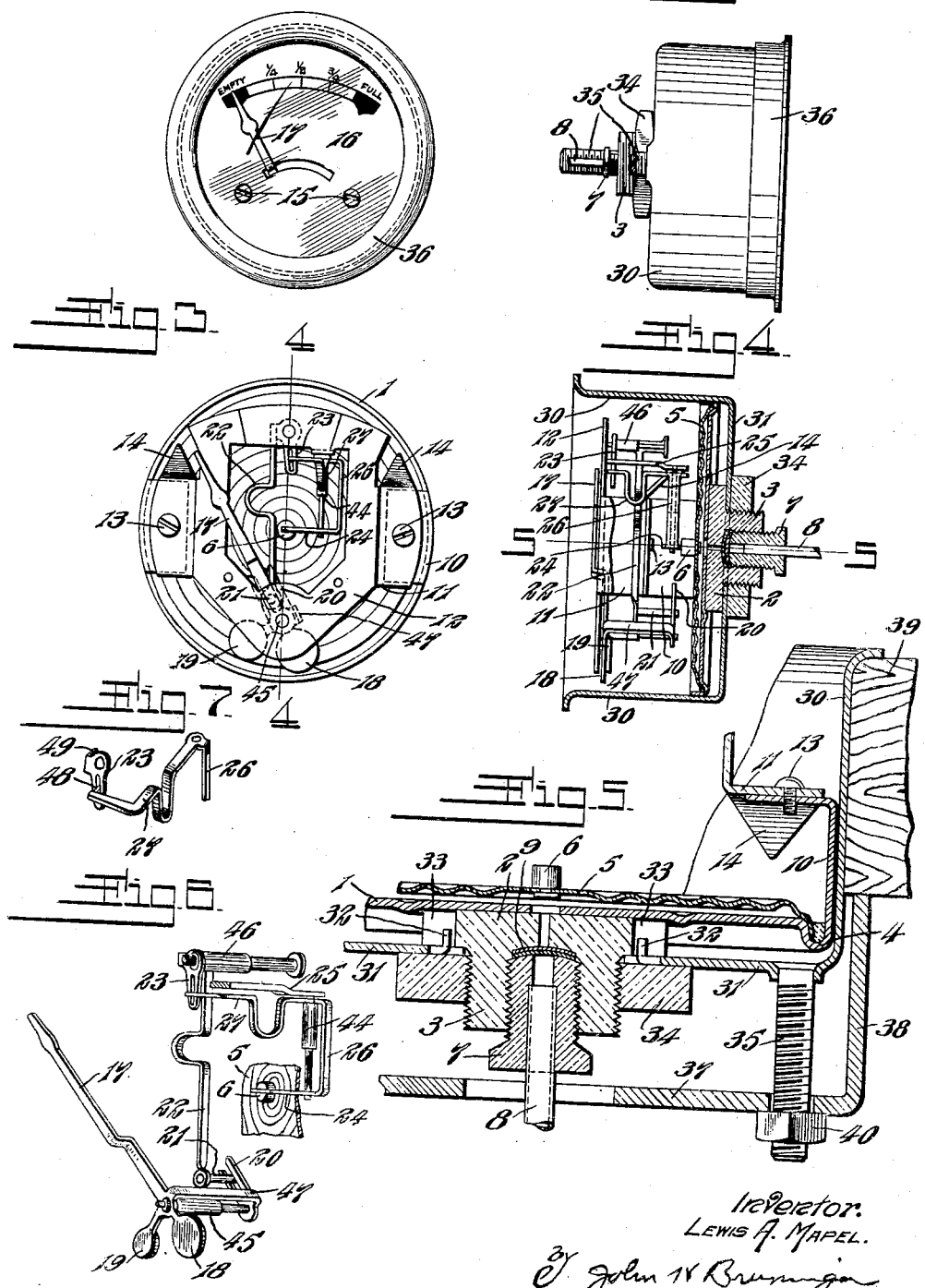
Inventor:
Lewis A. Mapel.
By John W. Brumgan
His Attorney.

March 31, 1931.  L. A. MAPEL  1,798,692
DIAPHRAGM PRESSURE GAUGE
Filed Nov. 9, 1923  2 Sheets-Sheet 2
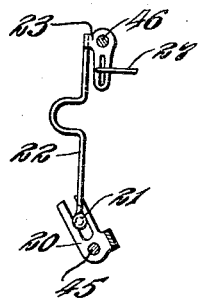
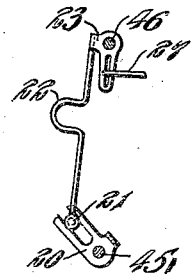
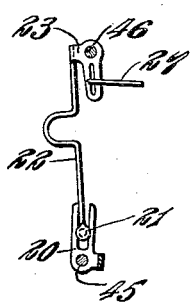
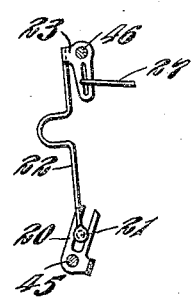
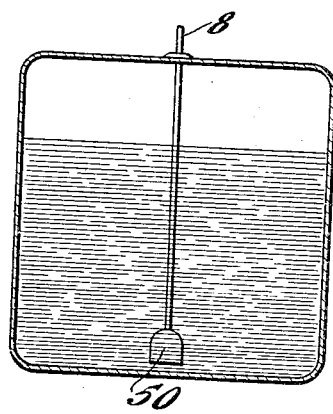
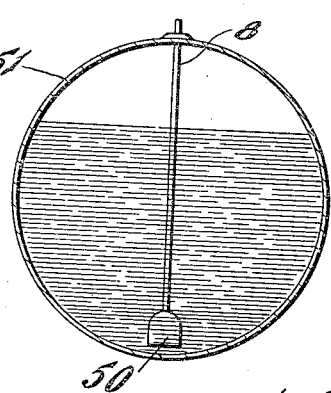
Inventor.
LEWIS A. MAPEL.
By John N Bruninga
His Attorney.

Patented Mar. 31, 1931

1,798,692

UNITED STATES PATENT OFFICE

LEWIS A. MAPEL, OF ST. LOUIS, MISSOURI, ASSIGNOR TO AUTOMATIC APPLIANCE COMPANY, OF ST. LOUIS, MISSOURI, A CORPORATION OF MISSOURI

DIAPHRAGM PRESSURE GAUGE

Application filed November 9, 1923. Serial No. 673,744.

This invention relates to indicating instruments and more particularly to that type adapted for the indication of the head of a liquid in a tank as described in application Serial Number 476,333, filed June 9, 1921.

In the apparatus described in the application referred to, a volume of air in a pressure chamber and sealed by the liquid, is under the pressure due to the variable head of the liquid in a tank, and a lead connects this chamber to an indicating instrument provided with a diaphragm acting on an indicator; accordingly the indication of the indicator will vary in accordance with the level of the liquid in the tank. Under normal conditions and as long as the body of the liquid is under atmospheric pressure, the pressure on the diaphragm and in the diaphragm chamber will never drop below atmospheric pressure. If, however, the liquid body is under a pressure less than atmospheric, as occurs when the air vent of the tank becomes stopped up, the pressure in the diaphragm chamber may drop below atmospheric pressure. In such a case pressure on the opposite side of the diaphragm may press it inwardly so as to place it under a reversed stress sufficiently to distort the same.

An indicating instrument of the character described must be attached to a support and in a position for observation. Such attachment is, however, liable to distort the diaphragm, as well as the mechanism connected for operation thereby, and thereby affect the accuracy of the instrument.

One of the objects of this invention, therefore, is to provide an indicating instrument in which the base for the diaphragm, and to which it is peripherally attached, is provided with a rigid supporting backing so as to avoid distortion.

Another object of this invention is to provide a base which will prevent distortion of the diaphragm when subjected to an internal air pressure less than atmospheric pressure.

Another object of this invention is to provide an instrument in which the mechanism is arranged in the housing in such a manner and the instrument so arranged for attachment, that no strain will be thrown on the diaphragm.

Another object of this invention is to provide an instrument in which the mechanism connecting the diaphragm with the indicator or pointer, is mounted on the diaphragm backing or support.

Another object is to provide a frame on which the mechanism is assembled and which frame is arranged for mounting on the diaphragm backing.

Another object is to provide an indicating instrument which will not only indicate accurately the level or head of the liquid in a tank, but in which the pointer will move uniformly over its scale, irrespective of the slowing up action of the diaphragm or the varying cross section or shape of the tank.

Another object is to improve the instrument and mechanism in order to improve its construction, action and adjustment.

Further objects will appear from the detailed description taken in connection with the accompanying drawing, in which:

Figure 1 is a face view of an instrument embodying this invention;

Figure 2 is a side elevation;

Figure 3 is a face view with the dial and housing removed;

Figure 4 is a section on line 4—4, Figure 3;

Figure 5 is an enlarged sectional detail on line 5—5, Figure 4;

Figure 6 is an enlarged detail perspective view of the mechanism;

Figure 7 is a detail of Figure 6; and

Figures 8 to 13 inclusive are diagrammatic views illustrating the operation of the instrument.

Referring to the accompanying drawing, 1 designates a base which is not only of comparatively heavy construction but is also ribbed circumferentially so as to provide a rigid base. This base has attached thereto or formed thereon a boss 2 having a threaded nipple 3. This boss forms a rigid supporting backing for the diaphragm base. The base 1 is formed to provide a peripheral groove 4 arranged to receive the margin of a diaphragm 5 of any suitable and usual construction, except that it is comparatively thin and sensitive. This diaphragm is secured to the base and in the groove 4 by solder and is provided centrally with an abutment 6. The diaphragm forms with the base a diaphragm chamber and the base, boss, and nipple are centrally perforated to provide an air inlet. The nipple is threaded internally to receive a coupling 7 to which is attached a lead 8 from the pressure chamber in a tank, so that the pressure of the air will be applied to the diaphragm. A dampener 9 of any suitable form may be provided.

The base has formed thereon lugs 10 which form supports for corresponding lugs 11 on a frame 12 and which are secured together by screws 13. The lugs 11 have feet 14 extending inwardly nearly to the diaphragm. Attached to the frame 12 by screws 15 is a dial plate 16 provided with a scale as shown, and over which moves an indicator or pointer 17. This indicator or pointer is a part of a unit including a counter-weight 18, an actuating weight 19 and a slotted arm or lever 20 connected to 17 by a yoke 47; this unit is pivoted on a stud 45 on the frame 12. Another unit comprising arms 22 and 23 connected by a yoke 49 is pivoted on another stud 46 on the frame. The arm 22 has a pin 21 engaging the slotted arm 20 while the arm 23 is also slotted. Still another unit comprising arms 24 and 27 connected by a yoke 26 is pivoted on a stud 44 mounted on a bracket 25 projecting from the frame. The tip of the arm 24 is rounded and engages the abutment 6, while the arm 27 has a pintle 48 which enters the slot in the arm 23. It will also be noted that the arm 27 as well as the arm 22 has a reentrant bend.

A housing 30 is provided for the mechanism and the back 31 thereof is perforated to fit over the nipple so as to center the assembled mechanism in the housing. The housing has lugs 32 bent therefrom engaging corresponding recesses 33 in the boss 2; accordingly these lugs and recesses are arranged to interengage upon insertion of the mechanism into the housing in order to locate and prevent the same from shifting therein. A nut 34 threaded on the nipple 3 holds the mechanism in the housing. This housing has suitable attaching elements 35 in the form of screws, arranged to receive a clamp 37, the feet 38 of which engage the instrument board 39, the whole being secured by nuts 40, whereby the housing and the contained mechanism may be attached for observation. A glass front may be secured by a ring 36.

Where the instrument is used to indicate the level of the liquid in a tank, such as the fuel tank of an automobile, the lead 8 is connected to and terminates in a pressure chamber or dome 50, Figure 12, which is open at its lower end and close to the bottom of the tank 51. In such a case the rise of the liquid in the chamber 50 will cause compression of the air therein in accordance with the liquid level or head, and this is communicated to the diaphragm 5 and transmitted by the latter to the pointer 17.

Outward movement of the diaphragm will, through the lever mechanism, move the pointer against the action of its actuating weight over the scale and this movement is multiplied. The ratio of movement of the pointer with reference to that of the diaphragm can be varied by moving the points of engagement of the arms 22 and 27 with reference to the slots in the levers 20 and 23 respectively. This can be readily accomplished by bending the arms 22 and 27 to secure such result, which is facilitated by the provision of the reentrant bends in these arms. Moreover the pointer can be adjusted as to its zero position by bending of the bracket 25 which adjusts the position of the arm 24 with respect to the abutment 6.

It will be noted that the actuating arm provided with the weight 19 operates through the medium of the mechanism connecting the pointer with the diaphragm to hold the arm 24 in abutment with the diaphragm abutment 6. Accordingly the diaphragm will move the pointer over the scale against the action of this weighted arm, while the latter returns the pointer. It will, however, be noted that the arrangement is such that the weighted arm will stand horizontal when the pointer is at the median point of the scale. Accordingly the action of the weighted arm will be substantially uniform over the entire scale due to the fact that the leverage of the weight remains substantially uniform. While the arm 24 of the connected mechanism to the pointer is held in abutment with the diaphragm abutment 6, when the pressure on the diaphragm drops to a predetermined amount below atmospheric pressure, the pointer is arrested by engagement with the end of the slot in the dial plate; the diaphragm can, however, continue its movement without stressing the pointer, since the diaphragm abutment can disengage the arm 24.

In an instrument employing a diaphragm for actuating a pointer movable over a scale, the movement of the diaphragm is not uniform in accordance with the increase of pressure applied to the diaphragm but the movement of the latter is slowed up progressively; accordingly where the multiplying ratio of the transmitting mechanism to the pointer remains constant, the deflection will not be uniform, but the pointer will move over the scale at a decreasing rate as the pressure increases. This would require a scale in which the graduations are not uniformly spaced but decrease progressively therealong; this, of course, is not only undesirable but is also liable to be confusing. In accordance with this invention, therefore, the mechanism is so constructed that the multiplying ratio increases progressively in accordance with the progressive slowing up movement of the diaphragm, so as to cause one to compensate for the other, with the result that the pointer will move uniformly over the scale in accordance with the increase of pressure and in accordance with the variation of level or head of the liquid in the tank.

Referring to Figures 8 and 9, in which the former shows the mechanism at empty and the latter at full position, it will be seen that in the empty position (Figure 8) the arm 20 and the pin 21 on the lever 22 are in such relative position that the ratio is a minimum due to the fact that the pin is in the outer end of the slotted arm 20. As now the arm 20 is moved to the right the pin will ride into the slot so as to progressively increase the multiplying ratio. Accordingly the arm 20 and the pointer attached thereto will speed up as the diaphragm slows down; the parts can be so proportioned and adjusted that the speeding up movement of the arm 20 will compensate for the slowing up movement of the diaphragm so that the resultant movement of the pointer will be uniform in accordance with the pressure applied to the diaphragm and in accordance with the head or level of the liquid in the tank.

The above is correct for a tank (such as a rectangular or vertical cylindrical one) in which the cross section is constant at different vertical positions. The usual automobile fuel tank is however a horizontal cylinder (Fig. 13) in which the cross section varies. While a mechanism adjusted as above described will cause the pointer to move over the scale uniformly as the liquid level varies, it requires the adjustment as shown in Figures 10 and 11 when a horizontal cylindrical tank is used. In such a tank the head increases at a decreasing rate as the quantity of the liquid therein increases until the center of the tank is reached; above center the head increases at, however, an increasing rate. Now when the arm 20 is set so that in empty position it will be on the left hand of its center but will be positioned on the other side of the center when the pointer is in the full position, the mechanism will be fully compensated so that the pointer will move over the scale substantially uniformly in accordance with the quantity of liquid in the tank. During movement of the pointer to the median point on the scale, the multiplying ratio to the pointer is increased progressively, and this can readily be at a greater rate than the slowing up action of the diaphragm, so as to compensate for the latter as well as for the slowing up of the head or liquid level as the same rises in the tank. After the center of the tank is reached the arm 20 in passing over center causes the multiplying ratio to be again decreased in order to compensate for the speeding up of the head as well as the continued slowing up of the diaphragm. Accordingly slowing up the arm 20 will in practice not pass over the arm 20 (Figure 11) to the same extent as it center (Figure 11) to the same extent as it was initially on the other side of the center.

It will be seen that the mechanism is exceedingly flexible in its adjustment, for any desired adjustment of the arm 20 can be obtained by twisting the yoke 47. Any increase in the total movement of the pointer due to the adjustment of the pin 21 in the slot of lever 20 can be compensated for by adjustment of the pin along the slot in the arm 23, and vice versa. Furthermore the initial position of the pointer can be controlled by adjustment of the bracket 25 as previously described.

It will be seen that the mechanism is carried by a frame 12 on which it is assembled and that this frame is attached to the base 1 for the diaphragm, while the base is in turn backed by the boss 2 which provides a rigid backing. Accordingly the mechanism can be positioned accurately with respect to the diaphragm and when in place no strain is thrown on the diaphragm but on the boss 2. Furthermore the boss itself is clamped to the housing while the latter is fastened to its support. The mechanism mounted on the frame and diaphragm base is so arranged in the housing as to leave clearance whereby the mechanism in fact floats in the housing. Accordingly no strain will be thrown on the diaphragm, the mechanism generally or the diaphragm base. The mechanism when assembled on its frame 12 and out of its housing can be set on a surface and it will then be supported by the feet 14 and the pointer stud 45 so that the mechanism will not be disturbed. If the pressure on the diaphragm chamber should drop below that of the atmosphere, the diaphragm can move inwardly; it, however, is arrested by the base at a predetermined pressure below atmospheric pressure and without straining the diaphragm.

It is obvious that various changes may be made in details of construction without departing from the spirit of this invention; it is, therefore, to be understood that this invention is not to be limited to the specific details shown and described.

Having thus described the invention, what is claimed is:

1. An instrument of the character described comprising a housing, a rigid mounting having means for attaching the same to said housing, a rigid base plate secured to and backed by said mounting, and a diaphragm secured at its margin to said base plate and forming therewith a pressure chamber.

2. An instrument of the character described comprising a housing, a rigid mounting having means for attaching the same to said housing, a rigid base plate secured to and backed by said mounting, and a diaphragm secured at its margin to said base plate and forming therewith a pressure chamber, said diaphragm being so spaced from said base at normal pressure as to abut thereagainst at lower pressures.

3. An instrument of the character described comprising a housing, a rigid mounting having means for attaching the same to said housing, a rigid base plate secured to and backed by said mounting, a diaphragm secured at its margin to said base plate and forming therewith a pressure chamber, and mechanism mounted on said base plate and connected for operation by said diaphragm.

4. An instrument of the character described comprising a housing, a rigid mounting having means for attaching the same to said housing, a rigid base plate secured to and backed by said mounting, and a diaphragm secured at its margin to said base plate and forming therewith a pressure chamber, said mounting being adapted to support said base plate and said diaphragm free from said housing.

5. An instrument of the character described comprising a housing, a rigid mounting having means for attaching the same to said housing, a rigid base plate secured to and backed by said mounting, a diaphragm secured at its margin to said base plate and forming therewith a pressure chamber, mechanism connected for operation by said diaphragm, a frame for supporting said mechanism in assembled relation, and means for attaching said frame to said base plate.

6. An instrument of the character described comprising a housing, a rigid mounting having means for attaching the same to said housing, a rigid base plate secured to and backed by said mounting, a diaphragm secured at its margin to said base plate and forming therewith a pressure chamber, mechanism connected for operation by said diaphragm, a frame for supporting said mechanism in assembled relation, means for attaching said frame to said base plate, and feet on and projecting beyond said frame and the mechanism thereon adapted to support the same when detached from said base plate.

7. An instrument of the character described comprising a rigid base plate, a diaphragm secured at its margin to said rigid base plate and forming therewith a pressure chamber, a boss secured to the back of said base plate and forming a mounting for said plate and said diaphragm, and a fastening element engaging said boss adapted for attachment to a support.

8. An instrument of the character described comprising, a support, a diaphragm thereon, an indicator, and an operating connection from said diaphragm to said indicator including a series of levers, each of said levers having a guide, and an element cooperating with each lever and continuously displaceable along the guide thereof in order to vary the ratio of movement of said indicator with respect to said diaphragm.

9. An instrument of the character described comprising, a support, a diaphragm thereon, an indicator, and an operating connection from said diaphragm to said indicator including a series of levers, each of said levers having a guide, and an element cooperating with each lever and bendable for displacement along the guide thereof in order to vary the ratio of movement of said indicator with respect to said diaphragm.

10. An instrument of the character described comprising, a diaphragm, a pointer the return movement of which is limited, connected mechanism held in abutment with said diaphragm in order to move said pointer in one direction, and means for moving said pointer in the opposite direction, said diaphragm being adapted to disengage said mechanism when the movement of said pointer is limited.

11. An instrument of the character described comprising, a diaphragm responsive to pressures greater and less than atmospheric pressures, a pointer the return movement of which is limited, connected mechanism held in abutment with said diaphragm in order to move said pointer in one direction, and means for moving said pointer in the opposite direction, said diaphragm being adapted to disengage said mechanism when the pressure is of a predetermined amount less than atmospheric pressure.

12. An instrument for indicating the varying level of liquid in a tank the cross section of which varies, comprising, a diaphragm adapted to be subjected to the pressure of the liquid head, a pointer, and mechanism for transmitting the movement of said diaphragm to said pointer adapted to progressively vary the multiplying ratio therebetween in accordance with the changes in the liquid head.

13. An instrument for indicating the varying level of liquid in a tank the cross section of which varies, comprising, a diaphragm adapted to be subjected to the pressure of the liquid head, an indicator, and mechanism for transmitting the movement of said diaphragm to said pointer adapted to progressively vary the multiplying ratio therebetween in accordance with the slowing up action of said diaphragm and in accordance with the changes in the liquid head.

14. In an instrument of the character described, an assembled unit comprising a pair of arms, a bendable yoke connecting said arms, and a bearing on which said unit is pivoted.

15. In an instrument of the character described, an assembled unit comprising a pointer, an arm connected thereto by a bendable yoke, an actuating arm connected thereto, and a bearing on which said unit is pivoted.

16. In an instrument of the character described, an assembled unit comprising a pointer, a bendable yoke, an arm connected thereto by said bendable yoke, an actuating arm and a counter-weight connected thereto, and a bearing on which said unit is pivoted.

In testimony whereof I affix my signature this 31st day of October, 1923.

LEWIS A. MAPEL.